(12) United States Patent
Yanobe

(10) Patent No.: US 11,293,786 B2
(45) Date of Patent: Apr. 5, 2022

(54) ROTARY ENCODER

(71) Applicant: TOPCON CORPORATION, Tokyo (JP)

(72) Inventor: Satoshi Yanobe, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 278 days.

(21) Appl. No.: 16/567,466

(22) Filed: Sep. 11, 2019

(65) Prior Publication Data

US 2020/0103255 A1 Apr. 2, 2020

(30) Foreign Application Priority Data

Sep. 28, 2018 (JP) .............................. JP2018-185902

(51) Int. Cl.
*G01D 5/26* (2006.01)
*G01D 5/244* (2006.01)
*G01D 18/00* (2006.01)

(52) U.S. Cl.
CPC ........... *G01D 5/266* (2013.01); *G01D 5/2448* (2013.01); *G01D 5/24495* (2013.01); *G01D 18/001* (2021.05)

(58) Field of Classification Search
CPC .. G01D 18/001; G01D 18/004; G01D 5/2448; G01D 5/2449; G01D 5/24495; G01D 5/266; G01D 5/3473
See application file for complete search history.

(56) References Cited

U.S. PATENT DOCUMENTS 7,012,703 B2 * 3/2006 Allman ................ G01D 18/001
356/616
2008/0149816 A1 * 6/2008 Wang .................. G01D 5/34707
250/231.18

(Continued)

FOREIGN PATENT DOCUMENTS

JP 4824415 B2 9/2011

*Primary Examiner* — Kyle R Quigley
(74) *Attorney, Agent, or Firm* — Roberts Calderon Safran & Cole P.C.

(57) ABSTRACT

A rotary encoder includes: a rotary disk with an angle code; a light source; a detector reading the angle code; and a processing unit acquiring a reading value. The light source includes at least two light-emitting elements spaced from each other. Every time the rotary disk is rotated by a predetermined angle, where an arbitrary angle from a rotation angle θ within a reading range on the detector is provided as φ, the processing unit acquires reading values $f_I(\theta+\varphi)$ and $f_I(\theta)$ with a first light-emitting element and a reading value $f_{II}(\theta+\varphi)$ with a second light-emitting element, to calculate a reading value error due to deflection at an angle θ+φ based on the difference between the reading values $f_{II}(\theta+\varphi)$ and $f_I(\theta+\varphi)$, to obtain a difference $g_I(\theta,\varphi)$ between the reading values $f_I(\theta+\varphi)$ and $f_I(\theta)$ such that the error is reflected, and to self-calibrate based on a change in the difference $g_I(\theta,\varphi)$.

2 Claims, 7 Drawing Sheets

(56) References Cited

U.S. PATENT DOCUMENTS

| | | | |
|---|---|---|---|
| 2010/0181468 A1* | 7/2010 | Nakamura | G01D 18/001 250/231.13 |
| 2013/0124128 A1* | 5/2013 | Yamazaki | G01D 18/001 702/92 |
| 2015/0247746 A1* | 9/2015 | Schindler | G01D 18/00 250/231.14 |

* cited by examiner

ROTARY ENCODER

CROSS-REFERENCE TO RELATED APPLICATION(S)

The present application claims priority under 35 U.S.C. § 119 to Japanese Patent Application No. 2018-185902 filed Sep. 28, 2018. The contents of this application are incorporated herein by reference in their entirely.

TECHNICAL FIELD

The present disclosure relates to a rotary encoder, and more particularly, to a rotary encoder capable of self-calibration.

BACKGROUND ART

A rotary encoder used for a surveying apparatus measures a horizontal angle and a vertical angle by using a rotary disk that rotates in conjunction with a telescope and a detector that reads a slit indicative of a scale or an angle code provided along the circumferential direction of this rotary disk.

The main causes of errors in measured values of the rotary encoder include the eccentricity of attachment of the rotary disk to a rotating shaft, and the scale or angle codes not attached at completely equal intervals.

To remove such an error, in the rotary encoder disclosed in Patent Document 1, every time the rotary disk is rotated by a predetermined angle, where a rotation angle of the rotary disk is provided as $\theta$ and an arbitrary angle from the rotation angle $\theta$ within a reading range on the detector is provided as $\varphi$, reading values $f(\theta+\varphi)$ and $f(\theta)$ within the reading range on the detector can be acquired, and the self-calibration of the reading value $f(\theta)$ can be carried out based on a change in a difference $g(\theta,\varphi)$ between the reading values $f(\theta+\varphi)$ and $f(\theta)$ when the rotary disk is rotated one turn.

RELATED ART DOCUMENT

Patent Document

Patent Document 1: Japanese Patent No. 4824415

SUMMARY OF INVENTION

Problems to be Solved by the Invention

However, in the rotary encoder of Patent Document 1, no consideration is given to an error caused by deflecting of the rotary disk toward and away from a light source during rotation (hereinafter referred to as "deflection"), and particularly, in the case of a rotary encoder for a surveying apparatus required to perform high precision measurement, the rotary encoder has a problem that calibration accuracy may not be sufficient.

The present invention has been made in view of the situations, and an object thereof is to provide a rotary encoder capable of carrying out highly-accurate self-calibration with consideration given to an error caused by deflection of a rotary disk.

Means for Solving the Problems

To achieve the aforementioned object, an aspect of the present invention provides a rotary encoder including: a rotary disk with an angle code; a light source for irradiating the angle code; a detector for reading the angle code; and a processing for acquiring a reading value $f(\theta)$ based on the angle code read by the detector. The light source includes a plurality of light-emitting elements, wherein a first light-emitting element is disposed at a position corresponding to an angle $\theta$ of the rotation, wherein a second light-emitting element is disposed at a predetermined distance $x_L$ away from the first light-emitting element. Every time the rotary disk is rotated by a predetermined angle, where a rotation angle of the rotary disk is provided as $\theta$ and an arbitrary angle from the rotation angle $\theta$ within a reading range on the detector is provided as $\varphi$, the processing unit is configured to acquire reading values $f_I(\theta+\varphi)$ and $f_I(\theta)$ within a reading range on the detector in the case of using the first light-emitting element and a reading value $f_{II}(\theta+\varphi)$ on the detector in the case of using the second light-emitting element, to calculate a reading value error $\Delta\varphi_I$ due to deflection at an angle $\theta+\varphi$ based on a difference $h(\theta+\varphi)$ between the reading value $f_{II}(\theta+\varphi)$ and the reading value $f_I(\theta+\varphi)$, to obtain a difference $g(\theta,\varphi)$ between the reading values $f_I(\theta+\varphi)$ and $f_I(\theta)$ such that the reading value error $\Delta\varphi_I$ is reflected, and to self-calibrate the reading value $f_I(\theta)$ based on a change in the difference $g_I(\theta,\varphi)$.

In another aspect, preferably, the light source includes a third light-emitting element disposed at a position symmetrical to the second light-emitting element with respect to the first light-emitting element. The processing unit is configured to acquire a reading value $f_I(\theta-\varphi)$ within a reading range on the detector in the case of using the first light-emitting element and a reading value $f_{III}(\theta-\varphi)$ on the detector in the case of using the third light-emitting element, to calculate a reading value error $\Delta(-\varphi_I)$ due to deflection at an angle $\theta-\varphi$ based on a difference $h(\theta-\varphi)$ between the reading value $f_{III}(\theta-\varphi)$ and the reading value $f_I(\theta-\varphi)$, to obtain a difference $g_I(\theta, -\varphi)$ between the reading values $f_I(\theta-\varphi)$ and $f_I(\theta)$ such that the reading value error $\Delta(-\varphi_I)$ is reflected, to average changes in the difference $g_I(\theta,\varphi)$ and the difference $g_I(\theta, -\varphi)$, and to self-calibrate the reading value $f_I(\theta)$.

Benefit of Invention

According to the aspect, an object is to provide the rotary encoder capable of carrying out highly-accurate self-calibration with consideration given to an error caused by deflection of a rotary disk.

DESCRIPTION OF EMBODIMENTS

Figure 1:
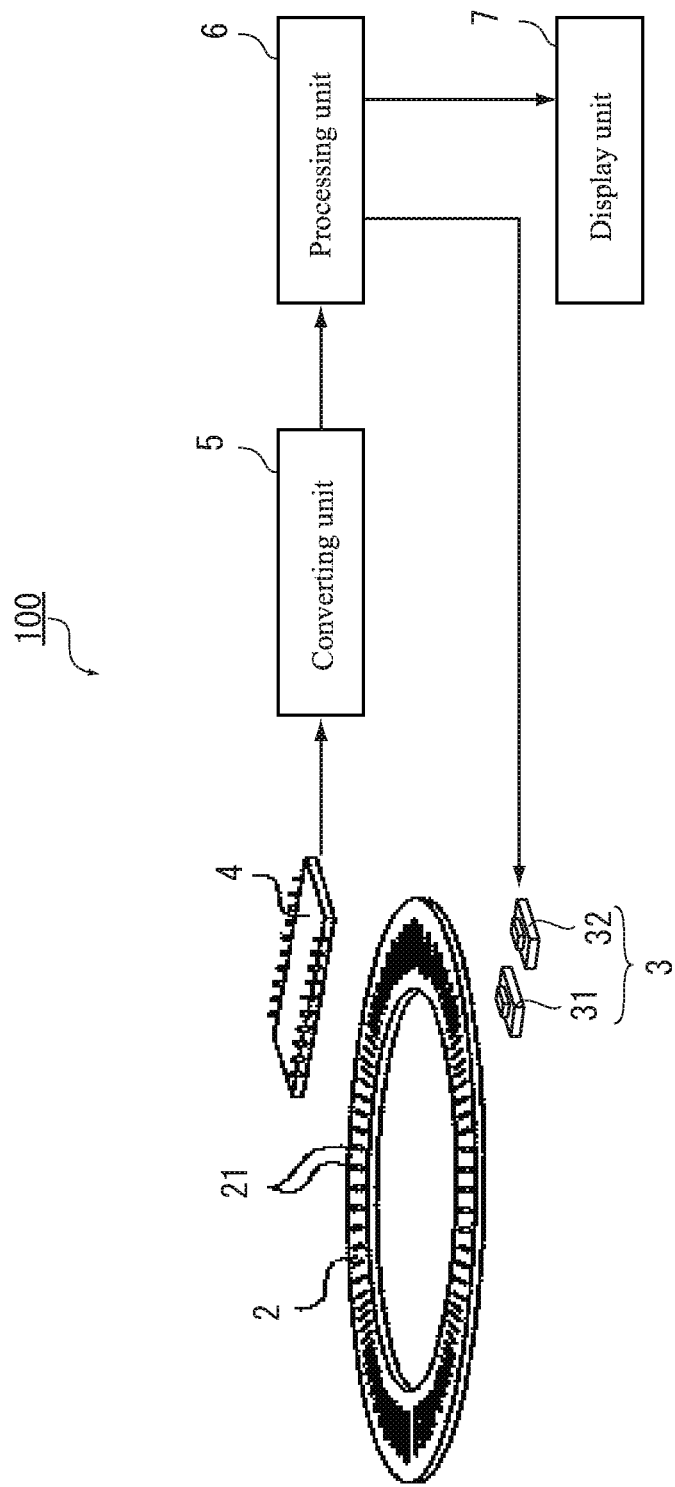
FIG. 1 is a configuration block diagram of a rotary encoder according to a first embodiment of the present invention.

Preferred embodiments of the present invention will now be described with reference to the drawings; however, the present invention is not limited thereto. In the embodiments, the same constituent elements are denoted by the same reference numerals and will not redundantly be described.

First Embodiment

1. Configuration of Rotary Encoder

A rotary encoder (hereinafter simply referred to as an "encoder") 100 according to this embodiment is a so-called absolute encoder. The encoder 100 includes a rotary disk 2 fixed to a rotating shaft (not depicted), a light source 3 fixed to a rotating shaft bearing (not depicted), a detector 4 receiving the light from the light source 3 via the rotary disk 2, a converting unit 5, a processing unit 6, and a display unit 7.

The rotary disk 2 is a doughnut-shaped disk and has a periphery portion provided with slits 21 composed of narrow slits that mean 0 and wide slits that mean 1 and forming angle codes indicative of angles.

The light source 3 includes a first light-emitting element 31 and a second light-emitting element 32, and the light-emitting elements are LEDs, for example. The light-emitting elements 31, 32 are disposed to face the slits 21 of the rotary disk 2 at a predetermined distance $H_{DL}$ (FIG. 2B). The first light-emitting element 31 and the second light-emitting element 32 are disposed at a predetermined distance $x_L$ in a direction orthogonal to the diameter of the rotary disk.

The detector 4 is a CCD linear sensor, for example, and is disposed on the side opposite to the light source 3 with respect to the rotary disk 2 so as to face the light source 3 at a predetermined distance $H_{DC}$ (FIG. 2B).

The converting unit 5 is an A/D converter and converts a detection signal from the detector 4 into a digital signal to output the signal to the processing unit 6.

The processing unit 6 is a microcontroller equipped with a ROM, a RAM, etc. for a CPU, controls light emission of the light source 3, decodes an angle code from the detection signal input from the converting unit 5, applies a known interpolation process to calculate an angle, and outputs the angle to the display unit 7 such as a liquid crystal display.

Figure 2A:
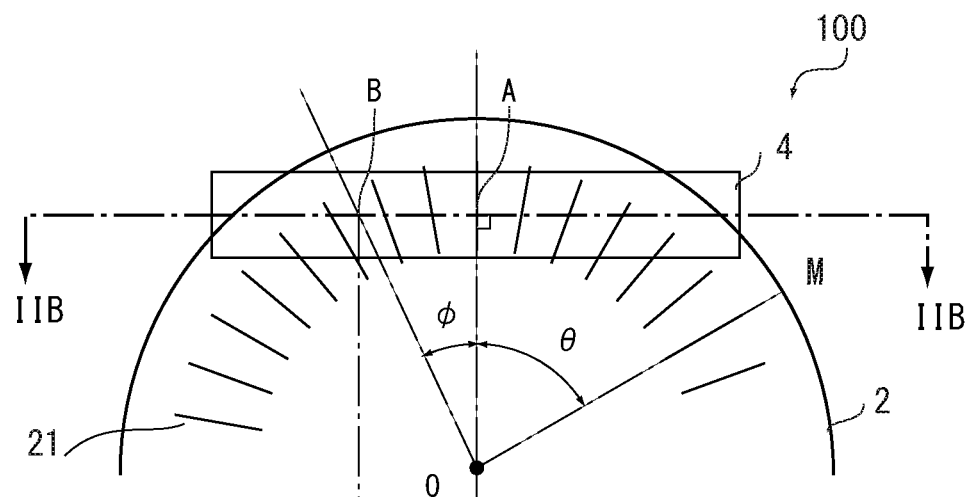
FIG. 2A is a plan view of the vicinity of a detector of the rotary encoder according to the first embodiment.
Figure 2B:
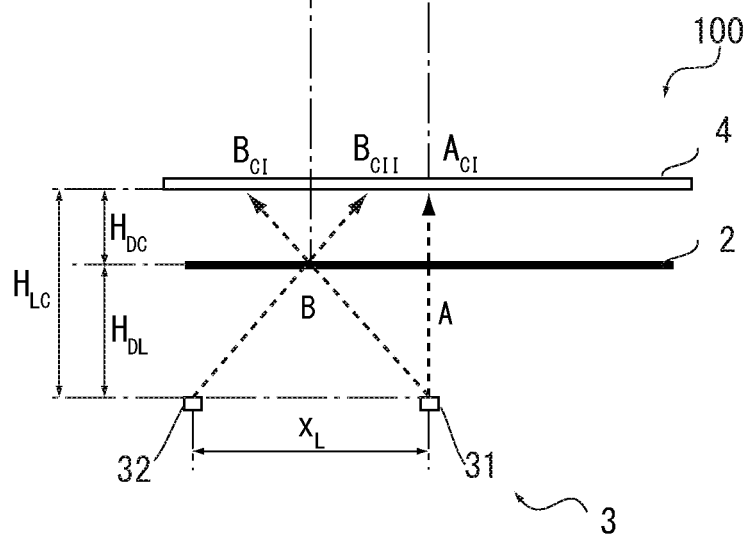
FIG. 2B is a cross-sectional view taken along a line IIB-IIB of FIG. 2A.

As depicted in FIGS. 2A and 2B, the detector 4 is disposed at a position orthogonal to the diameter of the rotary disk 2 to face the slits 21. A foot of a perpendicular line drawn from a center O of the rotary disk 2 to the detector 4 is provided as the point A. In addition, an appropriate point of the rotary disk 2 within a detection range of the detector 4 is provided as the point B. Reference sign M denotes a direction in which the angle code indicates 0°, and a true angle of the point A created from an M direction is provided as θ, while a true angle of an angle AOB is provided as φ. Therefore, the position of the point A is the position of the angle θ, and the position of the point B is the position of the angle θ+φ.

In this state, the first light-emitting element 31 is disposed at a position corresponding to the point A, and the second light-emitting element 32 is disposed at the predetermined distance $x_L$ away from the first light-emitting element 31 in an extending direction of the detector 4.

As depicted in FIG. 2B, if deflection is not taken into consideration, light emitted from the first light-emitting element 31 and made incident on the point A is incident on a reading position $A_{CI}$ of the detector 4. The light made incident on the point B is incident on a reading position $B_{CI}$ of the detector 4. The processing unit 6 can read respective angle codes of the point A and point B at the reading positions $A_{CI}$ and $B_{CI}$ and can apply the interpolation process to determine angle reading values $f_I(\theta)$ and $f_I(\theta+\varphi)$ at the point A and point B, respectively. In normal angle measurement, the angle reading value $f_I(\theta)$ at the point A is the measurement value.

Since the reading values $f_I(\theta)$ and $f_I(\theta+\varphi)$ are periodic functions with a period of 360° and can therefore be expressed by formulas 1 and 2 by using Fourier series.

$$f_I(\theta)=\theta+\Sigma A_i * \sin(i\theta+\alpha_i) \quad (1)$$

$$f_I(\theta+\varphi)=(\theta+\varphi)+\Sigma A_i * \sin\{i(\theta+\varphi)+\alpha_i\} \quad (2)$$

(where i means a natural number (1, 2, 3, . . . M/2) expressing the order of a higher harmonic, Ai means amplitude of the i-th higher harmonic, $\alpha_i$ means an initial phase of the i-th higher harmonic, and M means a scale number, which is an even number).

As depicted in FIG. 2B, if deflection is not taken into consideration, light emitted from the second light-emitting element 32 and made incident on the point B is incident on a reading position $B_{CII}$ of the detector 4. The processing unit 6 reads the angle code of the point B with the detector 4 and applies the interpolation process to determine an angle reading value $f_{II}(\theta+\varphi)$ at the point B. The details of the reading value $f_{II}(\theta+\varphi)$ will be described later.

2. Calculation of Deflection Error

Figure 3A:
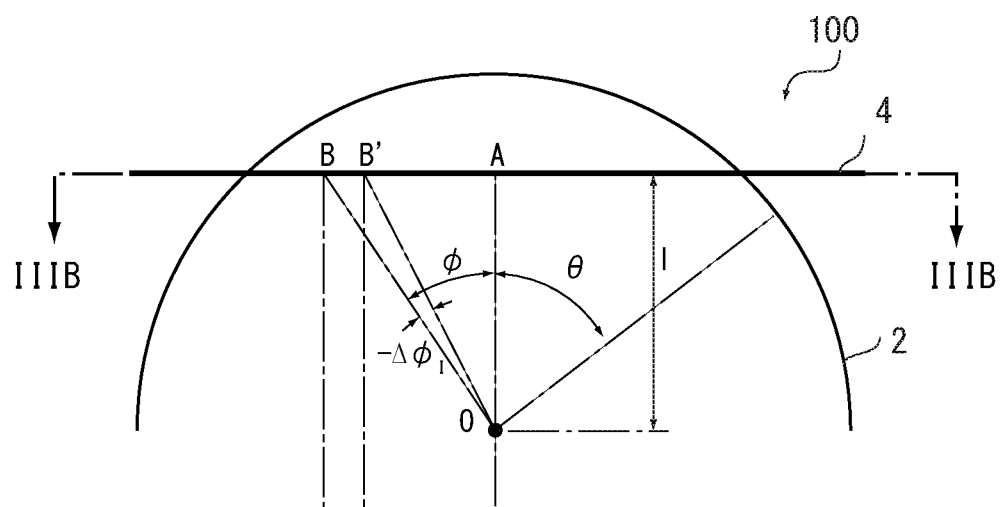
FIG. 3A is a plane view for explaining a method of calculating an error due to a deflection in the rotary encoder of the first embodiment when a first light-emitting element emits light.
Figure 3B:
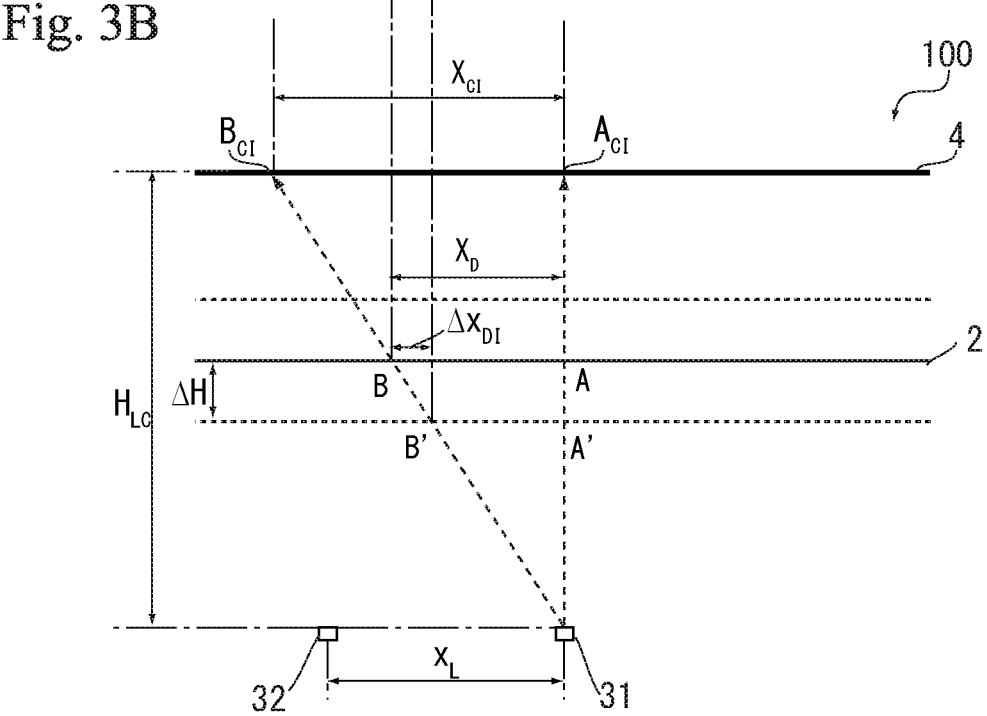
FIG. 3B is a cross-sectional view taken along a line IIIB-IIIB of FIG. 3A.

An influence of deflection on an angle reading value will be described with reference to FIGS. 3A and 3B. The deflection means displacement of the rotary disk 2 toward and away from the light source 3 due to rotation. In FIGS. 3A and 3B, description will be made of the case that the deflection occurs in the direction toward the light source.

When the deflection ΔH occurs, the incident position on the rotary disk 2 of the light emitted from the first light-emitting element 31 for detection of the angle θ+φ is a point B' shifted from the point B by a distance $\Delta x_{DI}$. Therefore, the angle code of the point B' is read instead of that of the point B at the reading position $B_{CI}$. Thus, the reading value $f_I(\theta+\varphi)$ is $(\theta+\varphi)+\Delta\varphi_I$ (FIG. 3A). Therefore, $-\Delta\varphi_I$ is an error caused by the deflection of the rotary disk.

The deflection error $\Delta\varphi_I$ at the position of the angle θ+φ can be calculated as follows.

From FIG. 3B, a relationship is as expressed by formula 3 among the deflection ΔH, a deviation $\Delta x_{DI}$ of the incident position due to the deflection ΔH, a distance $H_{LC}$ from the first light-emitting element 31 to the detector 4, and a distance $x_{CI}$ between the reading positions $A_{CI}$, $B_{CI}$.

$$x_{CI}/H_{LC}=\Delta x_{DI}/\Delta H \quad (3)$$

Therefore, the deviation $\Delta x_{DI}$ of the incident position can be expressed by formula 4.

$$\Delta x_{DI}=\Delta H/H_{LC} \cdot x_{CI} \quad (4)$$

From FIG. 3A, the tangent of the angle φ can be expressed by formula 5 by using a distance $x_D$ between A and B and a length l of a perpendicular line drawn from the center O of the rotary disk to the point A.

$$\tan \varphi = x_D/l \tag{5}$$

The tangent of $(\varphi+\Delta\varphi_I)$ is expressed as formula 6 by using the deviation $\Delta x_{DI}$ of the incident position.

$$\tan(\varphi+\Delta\varphi_I) = (x_D - \Delta x_{DI})/l \tag{6}$$

Therefore, if $\Delta\varphi_I$ is sufficiently small, $\Delta\varphi_I$ can be approximated as in formula 7.

$$\Delta\varphi_I \approx -(\Delta x_{DI})/l = -(\Delta H/H_{LC})(x_{CI}/l) \tag{7}$$

The deflection is also a periodic function with a period of 360° and is therefore expressed by formula 8 by using Fourier series.

$$\Delta\varphi_I = \Sigma(\Delta H_i/H_{LC})(x_{CI}/l)*\sin\{i(\theta+\varphi)+\beta_i\} \tag{8}$$

By adding this formula to formula 1, a measured angle value $f_I(\theta+\varphi)$ at the point B (angle $\theta+\varphi$) with consideration given to the deflection can be expressed by formula 9.

$$f_I(\theta+\varphi) = \theta+\varphi+\Sigma A_i*\sin\{i(\theta+\varphi)+\alpha_i\}+\Sigma(\Delta H_i/H_{LC})(x_{CI}/l) \\ *\sin\{i(\theta+\varphi)+\beta_i\} \tag{9}$$

In the case of $\varphi=0$, $x_{CI}=0$ is satisfied, and an error due to the deflection does not occur as expressed by formula 10. Specifically, the error due to the deflection does not affect the measurement of the angle $\theta$ itself.

$$f_I(\theta) = \theta+\Sigma A_i*\sin(i\theta+\alpha_i) \tag{10}$$

Description will be made of the influence of the deflection $\Delta H$ in the case of obtaining the angle reading value $f_{II}(\theta+\varphi)$ at the point $B_{CII}$ when the light is emitted by the second light-emitting element 32. The incident position on the rotary disk 2 of the light emitted from the second light-emitting element 32 is a point B" shifted from the point B by a distance $\Delta x_{DII}$.

Figure 4:
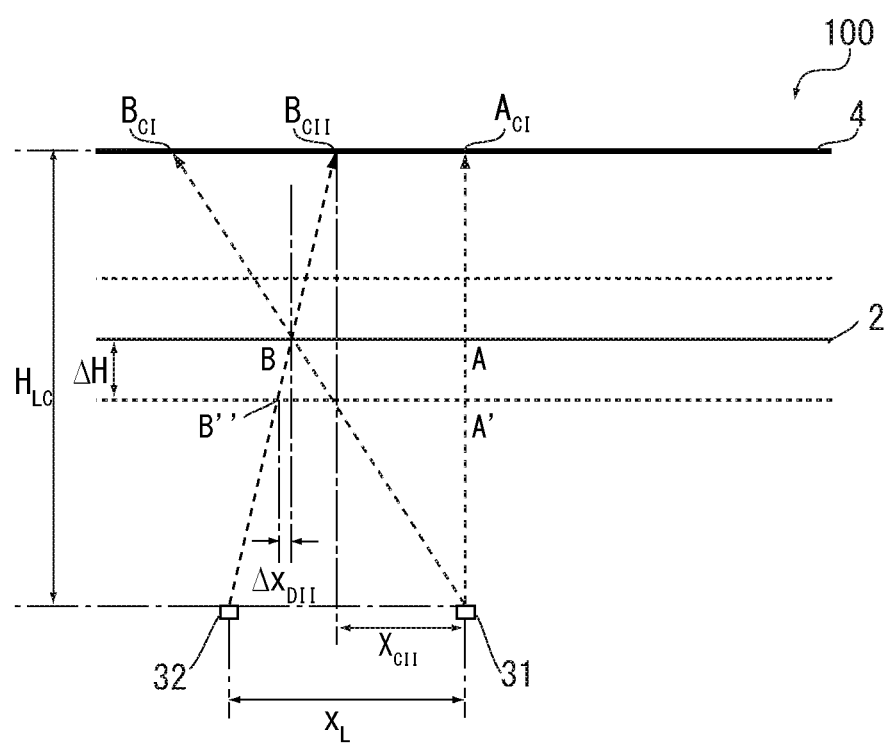
FIG. 4 is a view for explaining the method of calculating an error due to a deflection in the rotary encoder of the first embodiment and is a cross-sectional view similar to FIG. 3B when a second light-emitting element emits light.

A relationship at a position of $\theta+\varphi$ can be expressed by formula 11 from FIG. 4 among the distance $x_L$ between the first light-emitting element 31 and the second light-emitting element 32, a distance (angle reading position) $x_{CII}$ between the reading positions $A_{CI}$, $B_{CII}$, the distance $H_{LC}$ from the second light-emitting element 32 to the detector 4, a deviation $\Delta x_{DII}$ of the incident position due to the deflection $\Delta H$, and the deflection $\Delta H$.

$$(x_L - x_{CII})/H_{LC} = -\Delta x_{DII}/\Delta_H \tag{11}$$

Therefore, the deviation $\Delta x_{DII}$ of the incident position can be expressed by formula 12.

$$\Delta x_{DII} = (\Delta H/H_{LC})(x_{CII} - x_L) \tag{12}$$

Thus, as in the case that the light is emitted by the first light-emitting element 31, the angle reading value $f_{II}(\theta+\varphi)$ of the point $B_{CII}$ at the position of $\theta+\varphi$ can be expressed by formula 13.

$$f_{II}(\theta+\varphi) = -\theta+\varphi+\Sigma A_i*\sin\{i(\theta+\varphi)+\alpha_i\}+\Sigma(\Delta H_i/H_{LC}) \\ (x_{CII}-x_L)/l*\sin\{i(\theta+\varphi)+\beta_i\} \tag{13}$$

Therefore, a difference $h(\theta+\varphi)$ between the reading value $f_{II}(\theta+\varphi)$ according to the second light-emitting element 32 and the reading value $f_I(\theta+\varphi)$ according to the first light-emitting element 31 can be expressed by formula 14.

$$h(\theta+\varphi) = f_{II}(\theta+\varphi) - f_I(\theta+\varphi) = \Sigma(\Delta H_i/H_{LC})(x_{CII}-x_{CI}-x_L)/ \\ l*\sin\{i(\theta+\varphi)+\beta_i\} \tag{14}$$

From formula 8, $\Sigma(\Delta H_i/H_{LC})*\{\sin\{i(\theta+\varphi)+\beta i\} = \Delta\varphi_I/(x_{CI}/l)$ is acquired, and therefore, the error $\Delta\varphi_I$ of the angle reading value due to the deflection at the position of $\theta+\varphi$ can be expressed by formula 15.

$$\Delta\varphi_I = x_{CI}/(x_{CII}-x_{CI}-x_L)*h(\theta+\varphi) \tag{15}$$

From the above, an angle reading value taking an influence of an error into consideration is obtained by $f_I(\theta+\varphi)-\Delta\varphi_I$.

Since the distance $x_L$ between the first light-emitting element 31 and the second light-emitting element 32 is known, and the distance (angle reading position) $x_{CI}$ between the reading positions $A_{CI}$, $B_{CI}$, and the distance (angle reading position) $x_{CII}$ between the reading positions $A_{CI}$, $B_{CII}$ can also be acquired, the error $\Delta\varphi_I$ of the angle reading value due to the deflection at the position of the angle $\theta+\varphi$ can be obtained.

3. Method of Self Calibration

A method of self-calibration of the encoder 100 according to this embodiment is the same as the method disclosed in Patent Document 1 except that the error $\Delta\varphi_I$ of the angle reading value due to the deflection is taken into consideration when the reading value $f_I(\theta+\varphi)$ at the position of $\theta+\varphi$ is acquired, and the outline is as follows.

First, the difference $g_I(\theta,\varphi)$ between the reading values $f_I(\theta+\varphi)$ and $f_I(\theta)$ can be expressed by a Fourier series as in formula 16 from formulas 1 and 2 according to the method described in Patent Document 1.

$$g_I(\theta,\varphi) = \varphi+\Sigma A_i*\sin(i\theta/2)*\cos\{i(\theta+\varphi/2)+\alpha_i\} = B_0 + \\ \Sigma B_i*\sin\{i\theta+\gamma_i\} \tag{16}$$

where $$\varphi = B_o \tag{17}$$

$$A_i = B_i*\sin(_i\varphi/2) \tag{18}$$

$$\alpha_i = \gamma_i -_i\varphi/2 + \pi/2 \tag{19}$$

Therefore, at a position with a rotation angle $\theta_j$ where the rotary disk 2 is rotated by a predetermined angle (e.g., 5°) obtained by dividing 360° into N equal parts, reading values $f_I(\theta_j)$, $f_I(\theta_j+\varphi)$ at points A and B are acquired. Here, j=1, 2, 3, ... N−1. By calculating $g_I(\theta_j,\varphi) = f_I(\theta_j+\varphi) - f_I(\theta_j)$ for each predetermined angle $\theta_j$, the respective coefficients $B_o$, $B_i$, $\gamma_i$ of the Fourier series in formula 16 can be calculated by a known method, and $\varphi$, $A_i$, $\alpha_i$ can be calculated from formulas 17, 18, 19. Therefore, the true angle $\theta$ can be obtained from formula 20, which is deformation of formula 1.

$$\theta = f(\theta) - \Sigma A_i*\sin(i\theta+\alpha_i) = f(\theta) - E(\theta) \tag{20}$$

Here, $E(\theta)$ means an error function $E(\theta) = \Sigma A_i*\sin(i\theta+\alpha_i)$.

4. Self-Calibration Procedures

Figure 5:
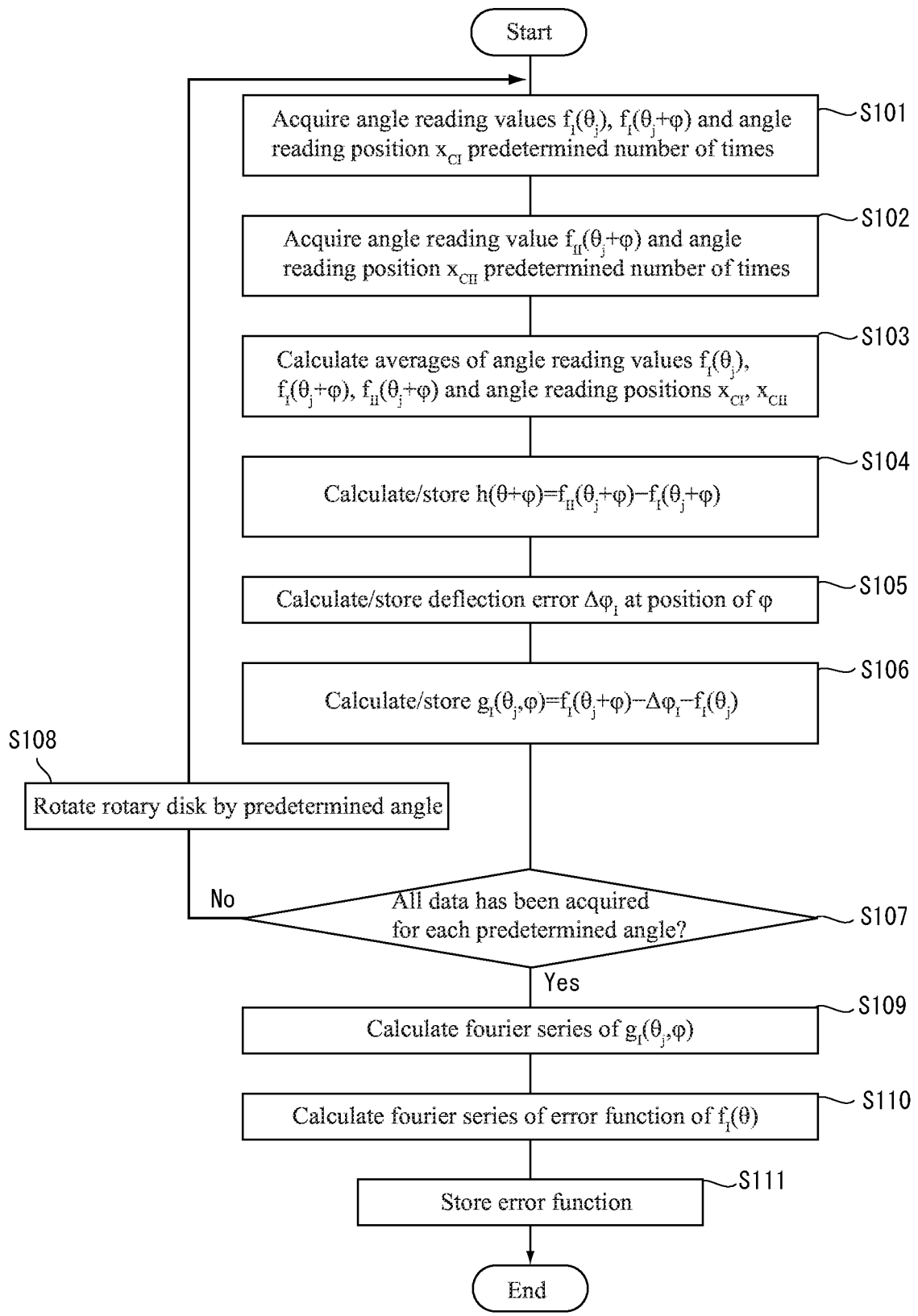
FIG. 5 is a flowchart illustrating self-calibration procedures of the rotary encoder of the first embodiment.

Self-calibration procedures of the encoder 100 according to this embodiment will be described with reference to FIG. 5. The following automatic calibration process is usually carried out by the processing unit 6.

When the self-calibration is started, in step S101, the light is emitted by the first light-emitting element 31 so as to acquire the reading values $f_I(\theta_j)$, $f_I(\theta_j+\varphi)$ of the reading positions $A_{CI}$, $B_{CI}$ on the detector 4 and the distance (angle reading position) $x_{CI}$ between $A_{CI}$ and $B_{CI}$, and this is carried out a predetermined number of times. After the measurement, the light emission of the first light-emitting element 31 is stopped.

Next, in step S102, the light is emitted by the second light-emitting element 32 so as to acquire the reading value $f_{II}(\theta_j+\varphi)$ of the reading position $B_{CII}$ on the detector 4 and the distance (angle reading position) $x_{CII}$ between $A_{CI}$ and $B_{CII}$, and this is carried out a predetermined number of times. After the measurement, the light emission of the second light-emitting element 32 is stopped.

Next, in step S103, averages of the reading values $f_I(\theta_j)$, $f_I(\theta_j+\varphi)$, $f_{II}(\theta_j+\varphi)$, the distance (angle reading position) $x_{CI}$ between $A_{CI}$ and $B_{CI}$, and the distance (angle reading position) $x_{CII}$ between $A_{CI}$ and $B_{CII}$ are calculated.

Next, in step S104, a difference $h(\theta_j+\varphi)=f_{II}(\theta_j+\varphi)-f_I(\theta_j+\varphi)$ between the reading values $f_{II}(\theta_j+\varphi)$ and $f_I(\theta_j+\varphi)$ at $\theta+\varphi$ is calculated and stored.

Next, in step S105, the error $\Delta\varphi_I$ of the angle reading value due to the deflection at the position of $\theta+\varphi$ is calculated by formula 15 and stored.

Next, in step S106, a difference $g_I(\theta_j,\varphi)$ between the reading value $f_I(\theta_j+\varphi)-\Delta\varphi_I$ and the reading value $f_I(\theta)$ taking the influence of the deflection into consideration is calculated and stored.

Next, in step S107, it is judged whether all possible data has been acquired, i.e., whether $g(\theta_j,\varphi)$ has been acquired for each predetermined angle $\theta_j$. For example, it is judged for $\theta$ whether $g_I(\theta_j,\varphi)$ has been acquired at intervals of 5° traversing 360°.

If all possible data has not been acquired (No), the process proceeds to step S107, the rotary disk 2 is manually or automatically rotated by a predetermined angle, and the process returns to step S101. Thereafter, steps S101 to S107 are repeated to obtain and store $g_I(\theta_j,\varphi)$ for each predetermined angle $\theta_j$.

When the predetermined number of times of data acquisition has been completed in step S109 (Yes), the process proceeds to step S108 to calculate, based on $g_I(\theta_j,\varphi)$ for each predetermined angle $\theta_j$, coefficients $B_0$, $B_n$, $\gamma_n$ of the Fourier series of $g_I(\theta,\varphi)$ described in formula 16.

Next, in step S110, coefficients $A_n$, $\alpha_n$ of the Fourier series of the error function $E(\theta)$ of the reading value $f(\theta)$ are calculated based on the coefficients $B_0$, $B_n$, $\gamma_n$.

Next, in step S111, the error function $E(\theta)$ is obtained based on the coefficients acquired in step S110 and is stored, and the process ends.

By carrying out the automatic calibration of the encoder 100 as described above, the true angle $\theta$ can be accurately obtained from the reading value $f(\theta)$ by using formula 1 in subsequent measurements.

According to the encoder 100 according to this embodiment, when a rotation angle of the rotary disk is provided as $\theta$ and an arbitrary angle from the rotation angle $\theta$ within a reading range on the detector is provided as $\varphi$, the second light-emitting element is disposed at a predetermined distance in addition to the first light-emitting element for measuring the rotation angle $\theta$, and this enables measurement of the angle reading value $f_I(\theta+\varphi)$ using the first light-emitting element 31 and the angle reading value $f_{II}(\theta+\varphi)$ using the second light-emitting element 32 at the position of the angle $\theta+\varphi$ as well as the respective angle reading positions on the detectors 4. Using these measured values and the known distance between the light-emitting elements makes it possible to obtain the error $\Delta\varphi_I$ of the angle reading value at the angle $\theta+\varphi$ due to the deflection at the position of the angle $\theta+\varphi$.

Therefore, the error function can be calculated by using the reading value $f_I(\theta_j+\varphi)-\Delta\varphi_I$ taking the error $\Delta\varphi_I$ of the angle reading value due to the deflection, and the self-calibration can be carried out with this error function, which enables highly accurate self-calibration.

Second Embodiment

Figure 6A:
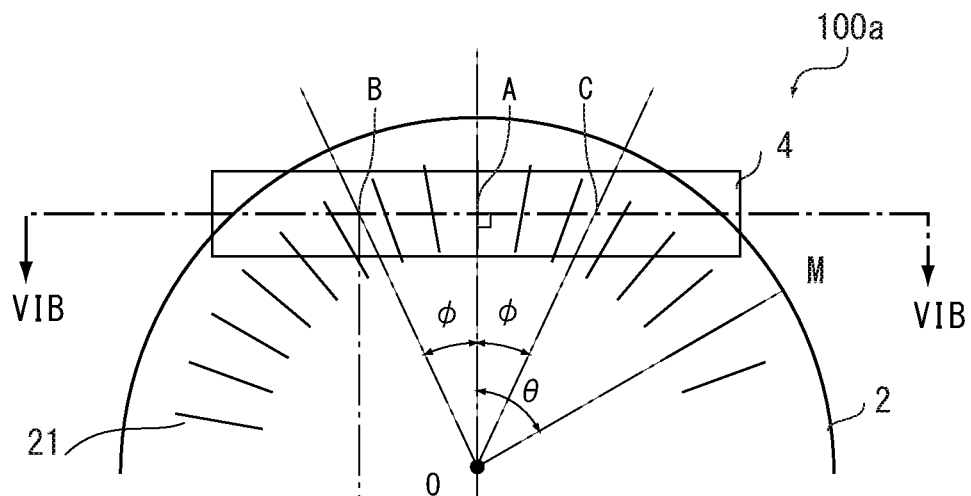
FIG. 6A is a plan view of the vicinity of a detector of a rotary encoder according to a second embodiment of the present invention
Figure 6B:
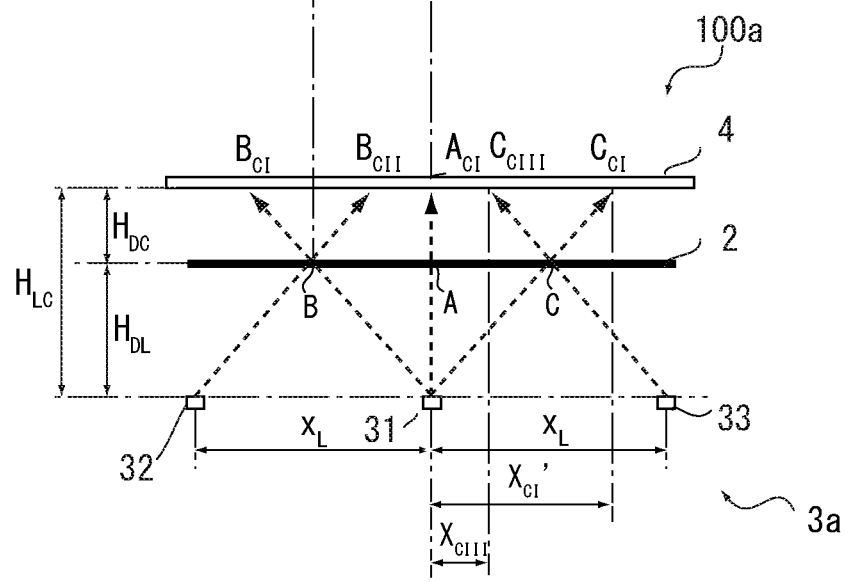
FIG. 6B is a cross-sectional view taken along a line VIB-VIB of FIG. 6A.

FIGS. 6A and 6B depict an encoder 100a according to a second embodiment. The encoder 100a has substantially the same configuration as the encoder 100 according to the first embodiment except that a light source 3a further includes a third light-emitting element 33. The third light-emitting element 33 is disposed symmetrically to the second light-emitting element 32 with respect to the first light-emitting element 31, that is, a perpendicular line drawn from the center O of the rotary disk 2 to the point A.

The third light-emitting element 33 is used for reading an angle at a position separated from the point A by the angle $\varphi$ in the direction opposite to the point B, that is, at a position of an angle $\theta-\varphi$. An error $\Delta(-\varphi_I)$ of an angle reading value due to the deflection at the angle $\theta-\varphi$ is also calculated by the same method as $\Delta\varphi_I$.

Figure 7:
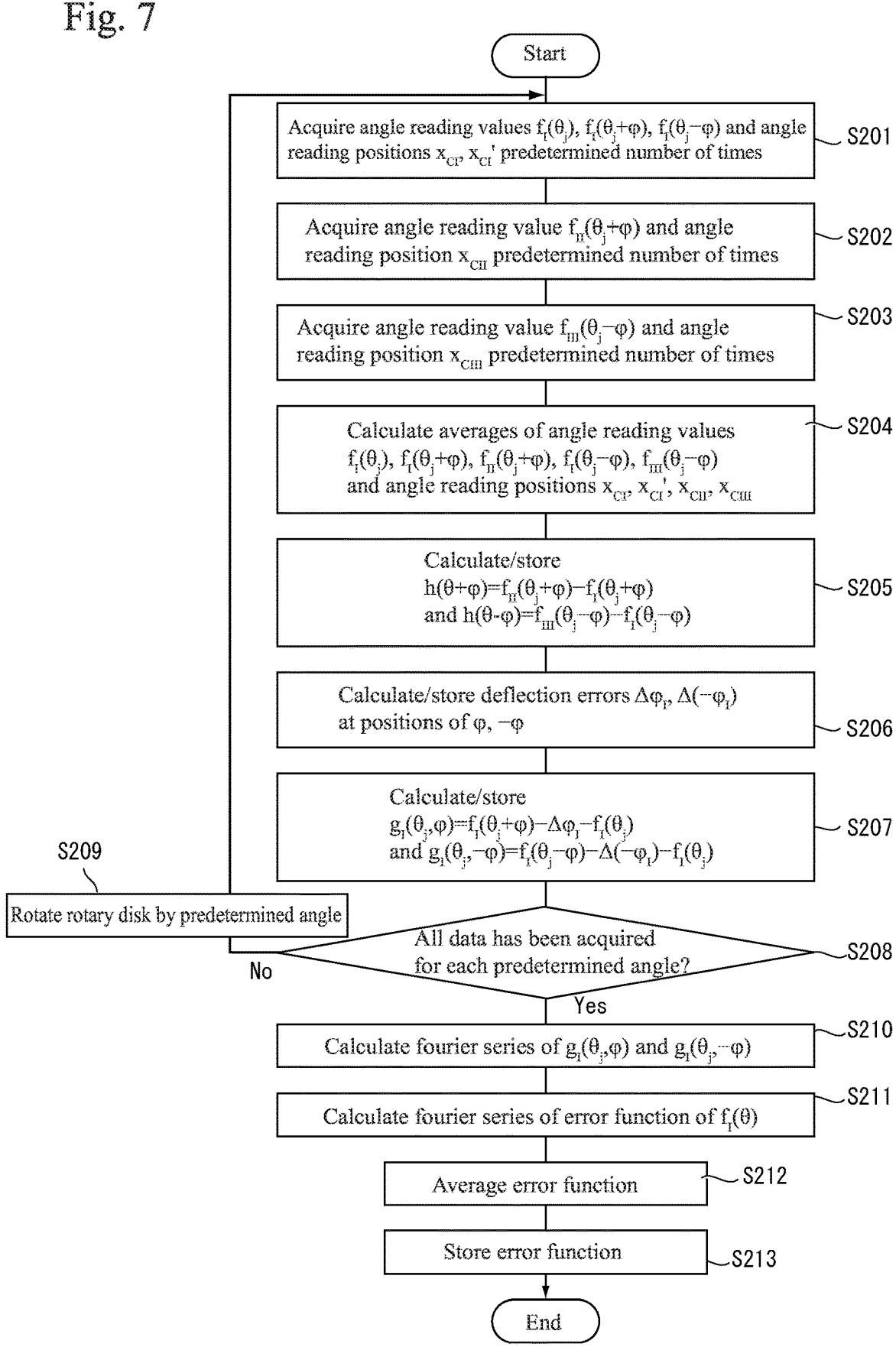
FIG. 7 is a flowchart illustrating self-calibration procedures of the rotary encoder of the second embodiment.

Next, self-calibration procedures of the encoder 100a according to this embodiment will be described with reference to FIG. 7. The basic process is the same as the procedures according to the first embodiment, and therefore, the same process will be cited without description.

When the self-calibration is started, in step S201, in addition to the process of step S101, an angle reading value $f_I(\theta_j-\varphi)$ and a distance (angle reading position) $x_{CI}'$ between $A_{CI}$ and $C_{CI}$ are acquired, and this is carried out a predetermined number of times. After the measurement, the light emission of the first light-emitting element 31 is stopped.

Next, in step S202, the measurement according to the second light-emitting element is carried out as in step S102.

Next, in step S203, the light is emitted by the third light-emitting element 33 so as to acquire a reading value $f_{III}(\theta_j-\varphi)$ of a reading position $B_{CIII}$ on the detector 4 and a distance (angle reading position) $x_{CIII}$ between $A_{CI}$ and $B_{CIII}$, and this is carried out a predetermined number of times. After the measurement, the light emission of the third light-emitting element 33 is stopped.

Next, in step S204, averages of the reading values $f_I(\theta_j)$, $f_I(\theta_j+\varphi)$, $f_{II}(\theta_j+\varphi)$, $f_{III}(\theta_j-\varphi)$ and the angle reading positions $x_{CI}$, $x_{CI}'$ acquired in steps S201 to S203 are calculated.

Next, in step S205, $h(\theta_j+\varphi)$ and $h(\theta_j-\varphi)$ are calculated and stored as in step S104.

Next, in step S206, the errors $\Delta\varphi_I$, $\Delta(-\varphi_I)$ of the angle reading values due to the deflection at the respective positions of $\theta+\varphi$, $\theta-\varphi$ are calculated and stored as in step S105.

Next, in step S207, $g_I(\theta_j,\varphi)$ and $g_I(\theta_j,\varphi)$ are calculated and stored as in step S106.

Thereafter, the processes in steps S208 to S211 are carried out as in steps S107 to S110 to calculate an error function of $f_I(\theta)$ obtained from each of $\theta+\varphi$ and $\theta-\varphi$.

The error function is averaged in step S212, the error function is stored in step S213, and the process ends.

According to this embodiment, since the reading errors of the reading values at the angles $\theta+\varphi$ and $\theta-\varphi$ can be averaged, higher calibration accuracy can be achieved.

Although the preferred embodiments of the present invention have been described, the embodiments are examples of the present invention and can be combined based on the knowledge of those skilled in the art, and such embodiments fall within the scope of the present invention.

DESCRIPTION OF SYMBOLS 2 rotary disk
3, 3a light source
31 first light-emitting element
32 second light-emitting element
33 third light-emitting element
4 detector
6 processing unit
100, 100a rotary encoder

What is claimed is:
1. A rotary encoder comprising:
a rotary disk with an angle code;

a light source for irradiating the angle code;

a detector for reading the angle code; and a processor for acquiring a reading value f(θ) based on the angle code read by the detector, wherein the light source includes a plurality of light-emitting elements for the same angle code, the light-emitting elements being disposed to face the same angle code of the rotary disc, wherein a first light-emitting element is disposed at a position corresponding to an angle θ of the rotation, wherein a second light-emitting element is disposed at a predetermined distance $x_L$ away from the first light-emitting element in a direction orthogonal to the diameter of the rotary disc, and wherein every time the rotary disk is rotated by a predetermined angle, where a rotation angle of the rotary disk is provided as θ and an arbitrary angle from the rotation angle θ within a reading range on the detector is provided as φ, the processor is configured to acquire reading values $f_I(\theta+\varphi)$ and $f_I(\theta)$ within a reading range on the detector in the case of using the first light-emitting element and a reading value $f_{II}(\theta+\varphi)$ on the detector in the case of using the second light-emitting element, to calculate a reading value error $\Delta\varphi_I$ due to deflection at an angle θ+φ based on a difference h (θ+φ) between the reading value $f_{II}(\theta+\varphi)$ and the reading value $f_I(\theta+\varphi)$, to obtain a difference $g_I(\theta,\varphi)$ between the reading values $f_I(\theta+\varphi)$ and $f_I(\theta)$ such that the reading value error $\Delta\varphi_I$ is reflected, and to self-calibrate the reading value $f_I(\theta)$ based on a change in the difference $g_I(\theta,\Phi)$, and wherein the reading value error $\Delta\varphi_I$ due to deflection is an error caused by deflecting of the rotary disc toward and away from the light source during rotation.

2. The rotary encoder according to claim 1, wherein the light source includes a third light-emitting element disposed at a position symmetrical to the second light-emitting element with respect to, the first light-emitting element, and wherein the processor is configured to acquire a reading value $f_I(\theta-\varphi)$ within a reading range on the detector in the case of using the first light-emitting element and a reading value $f_{III}(\theta-\varphi)$ on the detector in the case of using the third light-emitting element, to calculate a reading value error Δ ($-\varphi_I$) due to deflection at an angle (θ-φ) based on a difference h (θ-φ) between the reading value $f_{III}(\theta-\varphi)$ and the reading value $f_I(\theta-\varphi)$, to obtain a difference $g_I(\theta, -\varphi)$ between the reading values $f_I(\theta-\varphi)$ and $f_I(\theta)$ such that the reading value error Δ ($-\varphi_I$) is reflected, to average changes in the difference $g_I(\theta, -\varphi)$ and the difference g, (6, -cp), and to self-calibrate the reading value $f_I(\theta)$.

* * * * *